United States Patent [19]

Kronseder et al.

[11] 4,094,411

[45] June 13, 1978

[54] APPARATUS FOR CONVEYING UPRIGHT STANDING CONTAINERS AND REJECTING ABNORMAL CONTAINERS

[75] Inventors: Hermann Kronseder, Regensburger Strasse, Wörth, Donau, Germany; Karl Dullinger, Neutraubling, Germany; Kurt Matzinger, Regensburg, Germany

[73] Assignee: Hermann Kronseder, Worth, Donau, Germany

[21] Appl. No.: 746,275

[22] Filed: Dec. 1, 1976

[30] Foreign Application Priority Data

Dec. 13, 1975 Germany .............................. 2556338

[51] Int. Cl.² .............................................. B07C 9/00
[52] U.S. Cl. .......................................... 209/97; 209/98
[58] Field of Search ................. 209/73, 74 R, 82, 90, 209/97, 98, 99, 105; 198/398, 480, 481

[56] References Cited

U.S. PATENT DOCUMENTS

| 1,761,223 | 6/1930 | Meyer et al. | 198/481 |
| 1,825,751 | 10/1931 | Meyer et al. | 198/481 |
| 3,382,974 | 5/1968 | Mayeux | 209/74 R X |
| 3,780,847 | 12/1973 | Faessler et al. | 198/481 X |

FOREIGN PATENT DOCUMENTS 452,169   10/1948   Canada ................................... 209/82

*Primary Examiner*—Allen N. Knowles
*Assistant Examiner*—Joseph J. Rolla
*Attorney, Agent, or Firm*—Joseph P. House, Jr.

[57] ABSTRACT

Apparatus for conveying upright standing containers such as bottles includes a driven star wheel which advances the containers in spaced relationship along a curved path. Curved support and guide rails are concentric to the star wheel and are spaced apart a distance to engage the container bottom and top and to restrain the container from being discharged centrifugally from the star wheel path. Abnormal containers such as bottles broken off at their tops or necks will not be confined to the curved path of the star wheel and will be rejected by centrifugal force.

15 Claims, 6 Drawing Figures

APPARATUS FOR CONVEYING UPRIGHT STANDING CONTAINERS AND REJECTING ABNORMAL CONTAINERS

BACKGROUND OF THE INVENTION

The prior art has attempted to deal with abnormal containers on a conveyor. Normal containers are unbroken containers standing upright on their bottoms. Abnormal containers include tipped containers lying on their sides and fragments of broken containers. Such prior art devices are shown for example, in U.S. Pat. Nos. 2,369,557; 3,097,732; 3,369,642 and 3,610,399. These devices typically are disposed on or adjacent to a rectilinear portion of the conveyor and function to reject abnormal containers laterally off the side edge of the conveyor. Sweep arms or curved guide rails are utilized to divert the abnormal containers from its rectilinear path and to reject the same. Such devices have not proved entirely satisfactory for rejecting large fragments of broken bottles, especially those broken off at their tops or at the neck, leaving the major portion of the bottle still standing upright. Such abnormal containers are not rejected by the prior art devices because the remaining bottle fragment is taller than the guide rail and is not released thereby. Moreover, the bottles usually are in mutual contact fore and aft and a bottle having its top broken off will be held or clamped upright by adjacent bottles and will not fall down to reduce its height to the level where it will be released by the guide rail.

SUMMARY OF THE INVENTION

In accordance with the present invention, abnormal containers as above described are rejected by apparatus incorporated in a star wheel which transfers containers on a curved path along the conveying line. The star wheel separates the containers so that each container is isolated from adjacent containers and hence is not clamped or held upright thereby. Curved guide and support rails substantially concentric to the starwheel support and guide the containers so that normal containers travel around the curved path of the star wheel and are held on said curved path against centrifugal force which tends to divert them from said path. However, the support and guide rails are so disposed with respect to the containers and the curved path of the star wheel to leave an abnormal container rejecting gap therebetween so that abnormal containers having a height less than the spacing between the support rail and the guide rail are released by the guide rail and will be rejected by centrifugal force through said gap.

In most embodiments of the invention, the support rail is offset toward the inside of the curved path. Accordingly, when the guide rail releases an abnormal container, it will be unbalanced and will easily tip outwardly as soon as it is released and is subject to unrestricted centrifugal force. In some embodiments, the support rail is disposed or has a portion disposed near the outside of the curved path and has a lip which restrains outward movement of the container bottom. This lip provides a trip rail which enhances the tipping motion of an abnormal bottle in the course of its rejection. In some embodimemts such a rail is below the level of the container bottom, so that gravity starts the tipping movement of the container, thus to assist centrifugal force in tipping and rejecting the container.

In various embodiments of the invention the guide rail is adjacent the container top. Accordingly, abnormal bottles having broken tops or necks are shorter than the height of the gap and are rejected. In some embodiments there is another guide rail at a lower level, approximately adjacent the body shoulder of the bottle.

Other objects, features and advantages of the invention will appear from the disclosure hereof.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
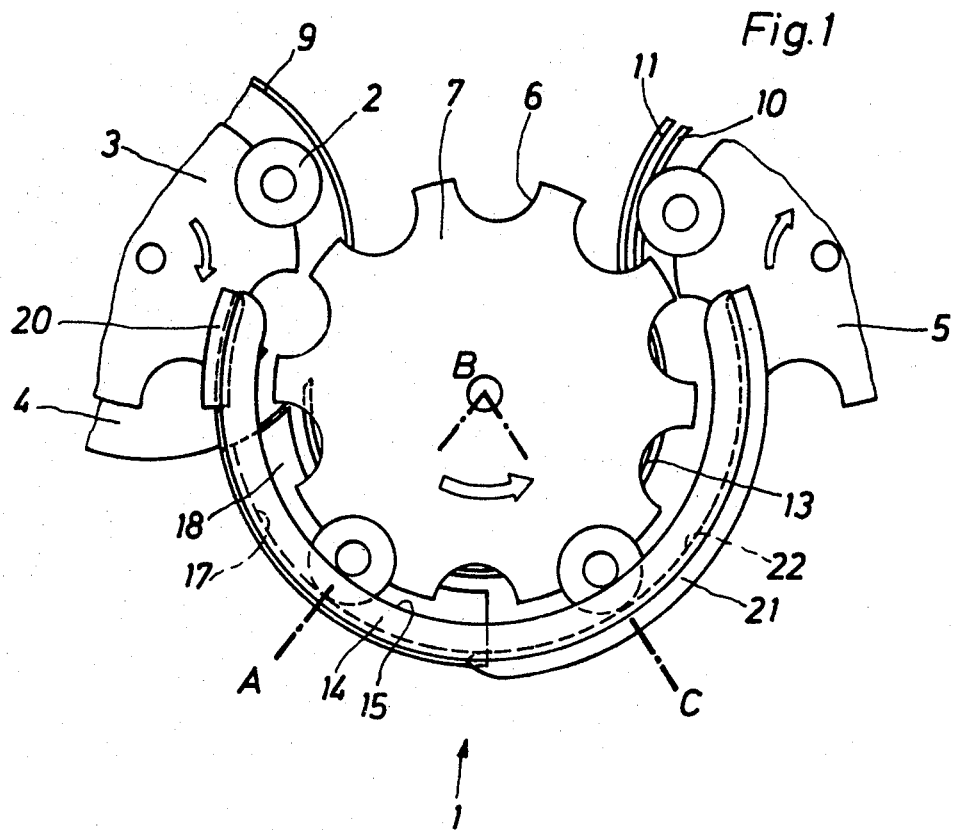
FIG. 1 is a top view of conveying apparatus for upright standing bottles which is integrated in a bottle treating apparatus.
Figure 2:
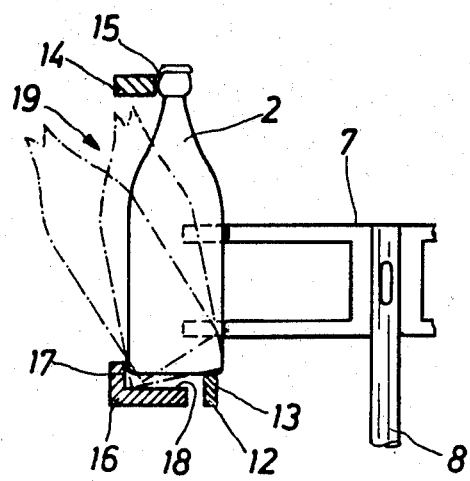
FIG. 2 is a fragmentary cross section along the line A—B of FIG. 1.
Figure 3:
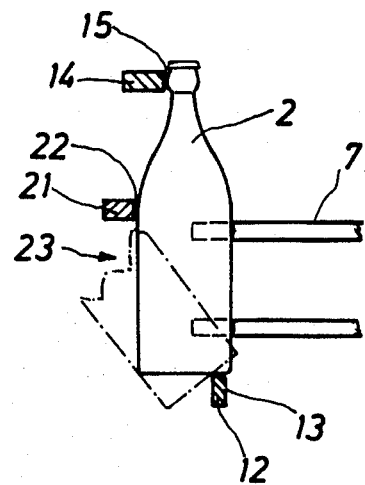
FIG. 3 is a fragmentary cross section along the line B—C of FIG. 1.

The conveying device 1 according to FIGS. 1–3 is part of a bottle handling apparatus and is constructed to transport upright standing beverage bottles 2 from a bottle table 4 of a bottle closing device (not shown) having an outfeed star wheel 3 which is driven in arrow direction to the infeed star wheel 5 driven in arrow direction of a labeling machine of known construction. Said conveying device comprises a transfer star wheel 7 provided with pockets 6. Star wheel 7 is mounted on a vertical shaft 8 and is driven synchronously in arrow direction to the star wheels 3, 5. The star wheel 7 consists of a hub and of two star plates respectively provided with vertically aligned recesses for formation of pockets 6. Containers such as bottles 2 on the bottle table 4 and in outfeed star wheel 3 are guided by means of a curved guide rail 9. Bottles in the infeed star wheel 5 are supported on a curved support rail 10 and are also guided by a curved guide rail 11.

The bottles 2 in the pockets 6 of transfer star wheel 7 are supported in upright standing position on a supporting rail 12 provided with a curved horizontal supporting surface 13 concentric with the curved path of bottles conveyed by star wheel 7. Curved support rail 12 is offset inwardly from the center of the curved path, thus to support the bottles 2 near the inside of the curved path. The supporting rail 12 extends curvilinearly between bottle table 4 and rail 10. Accordingly, complete normal bottles are normally conveyed continuously from star wheel 3 to star wheel 7 to star wheel 5 with the bottle bottoms sliding along the support rail surface 13.

A stationary curved guide rail 14 having a vertically oriented curved guiding surface 15 is disposed concentric to the star wheel 7. Said guide rail 14 lies at the level of the bottle head or crown. Guide rail 14 extends along the entire curvilinear length of the bottle path within conveying device 1 between bottle table 4 and infeed star wheel 5. The guiding surface 15 of rail 14 can also be disposed at a slightly higher level proximate the bottle closure cap.

A curved guide rail 16 with upstanding lip 17 is arranged stationary along the first half of the bottle path following bottle table 4. Lip 17 desirably overlaps the bottle side wall. Accordingly, in the first part of the travel of the bottles 2 along their curved path around the periphery of the star wheel the lip 17 of support rail 16 and guide rail 14 confine the bottle 2 to its curved path and against any tendency for it to be discharged radially outwardly therefrom by centrifugal force. Support rail 16 also has a horizontally disposed surface 18 which, as shown in FIG. 2, is desirably below the level of the bottle bottom, so that normal bottles are supported entirely on support rail 12.

After correct or normal bottles 2 have entered the conveying device 1 they are kept in the pockets 6 of star wheel 7 by the guiding surfaces 15 and 17 so that a trouble free and continuous transport of the bottles results. However, bottles with broken heads or necks, as illustrated in broken lines in FIG. 2 are released by the guide rail 14. These are subject to centrifugal force, causing tilting. Initially, they tilt over the upper supporting surface 13 of support rail 12 until the bottle bottom reaches the depressed supporting surface 18 of support rail 16. Thereafter, they trip over lip 17 through the opening or gap 19 and are thus rejected from the conveyor line. The initial drop of the abnormal bottles, caused by gravity, until they reach the depressed supporting area 18 facilitates rejection of abnormal bottles in the event of relatively small centrifugal force.

A short stub rail 20 midway between the rails 14, 16 and adjacent bottle table 4 prevents premature discharge of abnormal bottles.

The lipped guide rail 16 desirably terminates about half way along the curved path of bottles transported by the star wheel 7. Just before such termination the apparatus is desirably provided with another guide rail 21 which is mounted stationary along the second part of the bottle path and approximately at the level of the bottle body shoulder, as shown in FIG. 3.

Guide rail 21 is provided with a vertically curved guiding surface 22 along which the bottle body shoulder slides. This guide surface 22 begins shortly before the end of the lower guiding surface 17, in order to provide a trouble free conveying of the bottles, and it ends in the area where the bottles are transferred to the infeed star wheel 5. Guiding surfaces 22 and 15, ending at about the same place, provide an exact guide for correct or normal bottles so that they can be conveyed along their curved path at high speed. Abnormal bottles, however, which are broken below the level of the bottle body shoulder are released by the guide rail 21 and fall through the opening or gap 23 which spans between rails 21 and 12. Discharge is effectuated by means of centrifugal force and gravity. In all cases the circumferential length of the gaps 19 and 23 greatly exceeds the diameter of the bottles. Gap 19 extends from the circumference of star wheel 3 to the leading end of rail 21. Gap 23 extends from the leading end of rail 21 to star wheel 5.

The device will reject all abnormal bottles and various size fragments thereof, in the zone along the periphery of star wheel 7 between star wheels 3 and 5. Normal bottles will be conveyed in a trouble free manner.

Figure 4:
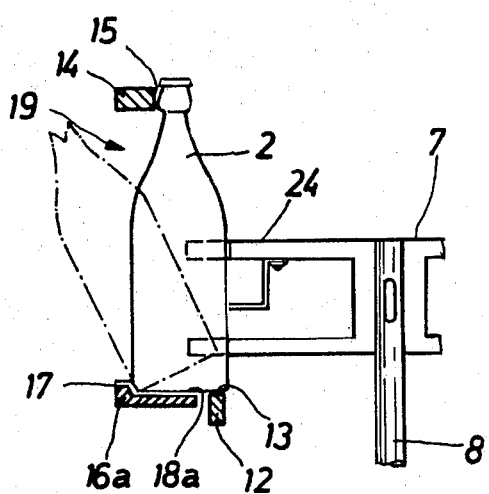
FIG. 4 is a fragmentary cross section similar to FIG. 2 of a modified embodiment.

FIG. 4 shows a modified embodiment in that the supporting surface 18a on the guide rail 16a is on the same level as the supporting surface 13 on the rail 12. In order to assure rejection of broken bottles with this kind of construction, with low centrifugal force, biasing means such as an elastic cushion 24 is attached to each pocket 6 of star wheel 7, cushion 24 normally projects into the pocket. The cushion 24 is compressed when a bottle enters the pocket so that broken bottles are ejected outward when released by the guide rail 14. Stationary spring elements under initial stress can be arranged along the bottle path instead of cushions 24, which push broken bottles out of the pockets of the star wheel. It is also possible to utilize blown-air nozzles, in place of the cushion 24.

Figure 5:
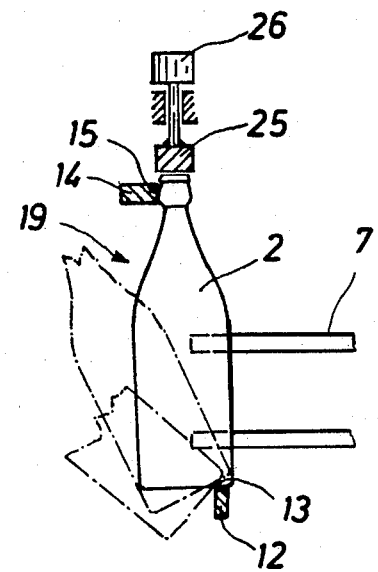
FIG. 5 is a fragmentary cross section similar to FIG. 2 of a further modified embodiment.

FIG. 5 shows a modified embodiment in that the guide rail 16 is omitted completely. In this case correct bottles 2 are guided by the supporting surface 13 on the inwardly offset rail 12, together with the upper guiding rail 14. The body of the bottle is pushed toward the center of the star wheel 7 and is kept in its pockets by means of friction between the bottle bottom and supporting surface 13. The gripping effect is increased by the face that the bottles slightly tilt outward caused by clearance between the guiding surface 15 and the pockets 6. With this kind of construction, broken bottles and fragments thereof of all kinds are rejected through the opening 19 between the guiding surface 15 and the supporting surface 13.

To increase the friction, yieldable slide bars 25 are arranged above the bottle path. Said slide bars 25 rest on the bottle closure caps under pressure of the weight 26 or of a spring. The construction according to FIG. 5 is especially useful for low conveying speed. With higher conveying speed centrifugal force affecting the bottles is too large.

Figure 6:
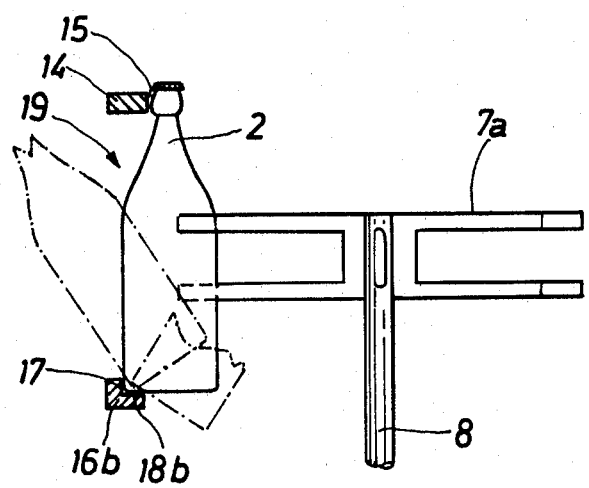
FIG. 6 is a fragmentary cross section similar to FIG. 2 of a still further modified embodiment.

FIG. 6 shows a modified embodiment in which the horizontal leg 18b or rail 16b is shortened. There is no inwardly offset support rail 12 in this embodiment. Correct bottles 2 are guided by means of guiding surfaces 15 and 17, while abnormal bottles fall through the opening 19 directing outward. Fragments fall out of the curved bottle path inward through the star wheel 7a.

We claim:

1. In apparatus for conveying upright standing containers on a curved path, said apparatus including a driven star wheel which advances containers in spaced relation along said path, said apparatus having a transfer point at the beginning of the curved path where containers are fed into the star wheel and a second transfer point at the end of the curved path where normal containers are discharged from the star wheel, the improvement for rejecting abnormal containers laterally from the star wheel intermediate said transfer points and comprising a curved support rail on which the container rests and a curved guide rail spaced above the level of the said curved support rail to form in a spacing between the guide and support rails and intermediate said transfer points an abnormal container rejecting gap, said gap being longer than the container diameter and higher than the abnormal container, said rails being substantially concentric to the star wheel, said guide rail being disposed outside the path of that part of the container which bears against it by centrifugal force, whereby abnormal containers of a height less than said spacing will be rejected by centrifugal force through said gap.

2. The apparatus of claim 1 in which said curved support rail is offset toward the inside of said curved path whereby rejected containers or fragments will tip outwardly about said rail in the course of their rejection.

3. The apparatus of claim 1 in combination with an overhead rail slidably engaged with the tops of normal containers.

4. The apparatus of claim 1 in which said guide rail is at the level of the bottle top.

5. The apparatus of claim 1 in which said guide rail is below the level of the bottle top.

6. The apparatus of claim 1 in which said curved support rail comprises a lipped support surface adjacent the lower outer edge of the container bottom.

7. The apparatus of claim 6 in which said support surface is at the same level as the container bottom.

8. The apparatus of claim 6 in which said support surface is below the level of the container bottom, said curved support rail further comprising another rail offset toward the inside of said curved path and on which normal containers ride, abnormal containers or fragments of containers being tipped by centrifugal force to drop into contact with said lipped support surface.

9. The apparatus of claim 1 in which said star wheel has pockets with means biasing said containers outwardly against said guide rail.

10. The apparatus of claim 9 in which said biasing means comprises an elastic pad.

11. The apparatus of claim 1 in which the curved guide rail is at the level of the container top, and a second curved guide rail is at the level of the container body, said second curved guide rail having a shorter arcuate extent than the first-mentioned curved guide rail.

12. The apparatus of claim 11 in which said curved support rail is offset toward the inside of said curved path, and a second curved support rail of shorter arcuate extent than the first-mentioned curved support rail and comprising a lipped support surface adjacent the lower outer edge of the container bottom.

13. The apparatus of claim 12 in which the second support rail is disposed at the first part of said curved path and the second guide rail is disposed at the last part of said curved path.

14. The apparatus of claim 12 in which said lipped support surface of said second curved support rail is at the same level as the container bottom.

15. The apparatus of claim 12 in which said lipped support surface of said second support surface is at a lower level than the container bottom.

* * * * *